United States Patent
Baxter et al.

(10) Patent No.: US 7,382,373 B2
(45) Date of Patent: Jun. 3, 2008

(54) METHOD AND APPARATUS FOR PRODUCING ANIMATION

(75) Inventors: Brent S. Baxter, Hillsboro, OR (US);
Paul M. Brown, Tacoma, WA (US);
William H. Clifford, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 10/741,808

(22) Filed: Dec. 19, 2003

(65) Prior Publication Data

US 2005/0134598 A1 Jun. 23, 2005

(51) Int. Cl.
*G06T 13/00* (2006.01)
(52) U.S. Cl. ........................ 345/473; 345/474; 345/475
(58) Field of Classification Search ...................... None
See application file for complete search history.

(56) References Cited

U.S. PATENT DOCUMENTS

| | | | | |
|---|---|---|---|---|
| 5,999,185 | A * | 12/1999 | Kato et al. ................... | 345/420 |
| 6,392,675 | B1 * | 5/2002 | Becker et al. .............. | 715/858 |
| 6,756,989 | B1 * | 6/2004 | Morgan et al. ............. | 345/582 |
| 6,956,576 | B1 * | 10/2005 | Deering et al. ............. | 345/475 |
| 7,084,875 | B2 * | 8/2006 | Plante ........................ | 345/473 |
| 2003/0169298 | A1 | 9/2003 | Ording | |
| 2005/0204306 | A1 * | 9/2005 | Kawahara et al. .......... | 715/782 |

OTHER PUBLICATIONS

Lengyel and Snyder, "Rendering with Coherent Layers", 1997, ACM Press, p. 233-242.*
Elias, H., "Motion Blur", http://web.archive.org/web/20031207133206/http://freespace.virgin.net/hugo.elias/graphics/x_motion.htm, (Dec. 7, 2003), 1-7.
Shimizu, C., et al., "Hardware Accelerated Motion Blur Generation", *Eurographics 2003*, 22 (3), (Sep. 1, 2003).
Ven, Jr., M. V., "MacOS X", http://www.coolmacintosh.com/macosxreview.html, (Mar. 21, 2001), 2.
International Preliminary Report on Patentability for PCT/US2004/040385 (11 pgs.).

* cited by examiner

*Primary Examiner*—Mark Zimmerman
*Assistant Examiner*—Kevin Xu
(74) *Attorney, Agent, or Firm*—Schwegman, Lundberg & Woessner, P.A.

(57) ABSTRACT

In some embodiments, a method includes generating blurred copies of an object by applying multi-texturing to the object during one pass through a graphics processing pipeline. In some embodiments, a graphics pipeline includes a texture memory and a graphics processor coupled to the texture memory. The texture memory provides a location to store texture information. The graphics processor provides processor to process the texture information by shifting and blending the texture information in one pass through the graphics processor to obtain shifted and blended texture information.

10 Claims, 4 Drawing Sheets

METHOD AND APPARATUS FOR PRODUCING ANIMATION

FIELD

The present invention relates to computer graphics. More particularly, the present invention relates to animation in computer graphics.

BACKGROUND

The demand and desire for animation or the portrayal of motion in computer systems continues to increase. For example, it is sometimes desired to reduce an open window in a computer system display to an icon. One process for producing this effect includes removing the window from the display and substituting the icon for the window. However, a more attractive visual effect is obtained by reducing the open window to an icon using animation. Animation includes the rapid display of a series of image frames during the transformation of a first image, such as a window, into a second image, such as an icon. To avoid undesired stroboscopic effects and jerkiness in the animation, the image frames are displayed at a rate of between about one-hundred frames per second and about two-hundred frames per second. Unfortunately, the current processes for generating and displaying image frames at these rates are expensive because they include large, high-speed memories and fast processors. In addition, some new and existing computer systems do not have the large, high-speed memories and fast processors required by the current processes for producing animations that are free of stroboscopic effects and jerkiness.

DESCRIPTION

Figure 1:
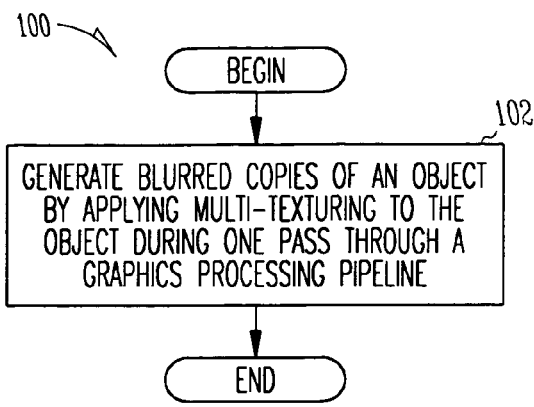
FIG. 1 is a flow diagram of a method for generating blurred copies of an object in accordance with some embodiments of the present invention.

In the following description of some embodiments of the present invention, reference is made to the accompanying drawings which form a part hereof, and in which are shown, by way of illustration, specific embodiments of the present invention which may be practiced. In the drawings, like numerals describe substantially similar components throughout the several views. These embodiments are described in sufficient detail to enable those skilled in the art to practice the present invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1 is a flow diagram of a method 100 for generating blurred copies of an object in accordance with some embodiments of the present invention. The method 100 includes generating blurred copies of an object by applying multi-texturing to the object during one pass through a graphics processing pipeline (block 102). When the blurred copies of the object are viewed on a display, such as the display included in the computer system shown in FIG. 4, the effect is substantially similar to the effect obtained by photographing the object using a finite exposure time. A description of applying multi-texturing to produce a blurred copy of an object is included in the description of FIG. 3 provided below. A description of applying multi-texturing to an object during one pass through a graphics processing pipeline is included in the description of FIG. 4 provided below.

The term "object," as used herein includes graphical objects, such as objects used in computer graphics. Graphical objects include any objects that can be displayed on a visual display. Some exemplary graphical objects include objects used in graphical user interfaces, such as windows, drop-down menus, web page displays, and icons.

The term "multi-texturing," as used herein, includes the operations of mapping multiple textures or surface patterns onto an object and shifting the patterns with respect to the object. Multi-texturing, which includes combination operations, such as adding textures, is performed in a single operation in a graphics hardware unit, such as a graphics pipeline. A description of an exemplary graphics pipeline suitable for use in connection with the method 100 is included in the description of the computer system shown in FIG. 4. Example applications of multi-texturing include light mapping, specular mapping, environment mapping, gloss mapping, morphing, and emboss-style bump mapping. The shifting operation includes shifting the pattern with respect to the object through the application of a geometrical transformation to the pattern.

Blurred objects, such as blurred windows and blurred icons, generated by the method 100 can be displayed on a visual display device, such as a cathode ray tube, a plasma display, or a liquid crystal display to create the illusion of motion in the object. The illusion of motion can be created by displaying a small number of the blurred objects, so the illusion of motion can be created in systems that do not include large, high speed memories and fast processors. In some embodiments, a small number of blurred objects includes five blurred objects displayed over about one-quarter of a second. Exemplary systems that include a visual display but do not include large, high speed memories and fast processors include computer systems, such as some laptop computers, and communication systems, such as some cellular telephones.

To show an object in motion, images of blurred copies of the object are presented at several different locations on a visual display in rapid succession. Each of the images of the blurred copies is formed by blending and shifting one or more instances of the object. The illusion of motion can be created by displaying a small number of the images of the blurred copies of the object. The images are created with only one pass through the graphics processor by using the multi-texturing feature of the a graphics processor and therefore can be presented in rapid succession. Creating images using only one pass through the graphics processor reduces the bandwidth required in the graphics processor when compared with the bandwidth required in the graphics processor for creating images using multiple passes through the graphics processor.

An exemplary animation suitable for generation using the method 100 includes rotating an application window, such as an spreadsheet window, as it recedes into the background. In this animation, the spreadsheet window is located at an initial position in three-dimensional space. A texture is applied to the spreadsheet window. Successive instances of the texture are blended with the first instance of the spreadsheet window. However, each time the texture is blended, the geometrical mapping of the texture is slightly rotated. In addition, each of the geometrical mappings include a reduction in size of the spreadsheet window to simulate the effect of the spreadsheet window moving from the front to the rear of the viewing space.

In the animation of the spreadsheet window, where all the instances of the rotating spreadsheet window overlap, the result of the multi-texturing can be opaque. However, where only some of the instances of the rotating spreadsheet window overlap, the result of the multi-texturing can be transparent. Thus, the method 100 can create a motion blurred image of a transparent object having a reduced transparency, where all the images overlap, when compared with the transparency of the motion blurred image, where only some of the images overlap.

In some embodiments, generating blurred copies of the object by applying multi-texturing to the object during one pass through the graphics processing pipeline includes generating a texture and shifting the texture with respect to the object before applying the texture to the object. For example, generating a blurred copy of a circular disk having a perimeter includes generating a texture, such as a bumped texture, and shifting the texture outside the perimeter of the circular disk. Applying the shifted, bumped texture to the circular disk generates an oblong disk having a bumped texture. The oblong disk is a blurred copy of the circular disk. Displaying a small number of the oblong disks in rapid succession on a visual display along the trajectory of motion creates the illusion of motion for the original circular disk. A more detailed description of this example is included in the description of FIG. 3 provided below.

In some embodiments, the method 100 further includes displaying the blurred copies of the object on a visual display, such as a plasma display. In some embodiments, generating blurred copies of the object by applying multi-texturing to the object during one pass through the graphics processing pipeline, includes applying bump texturing to the object. In some embodiments, generating blurred copies of the object by applying multi-texturing to the object during one pass through the graphics processing pipeline further includes displaying the blurred copies of the object on a visual display coupled to a communication device, such as a cellular telephone.

Figure 2:
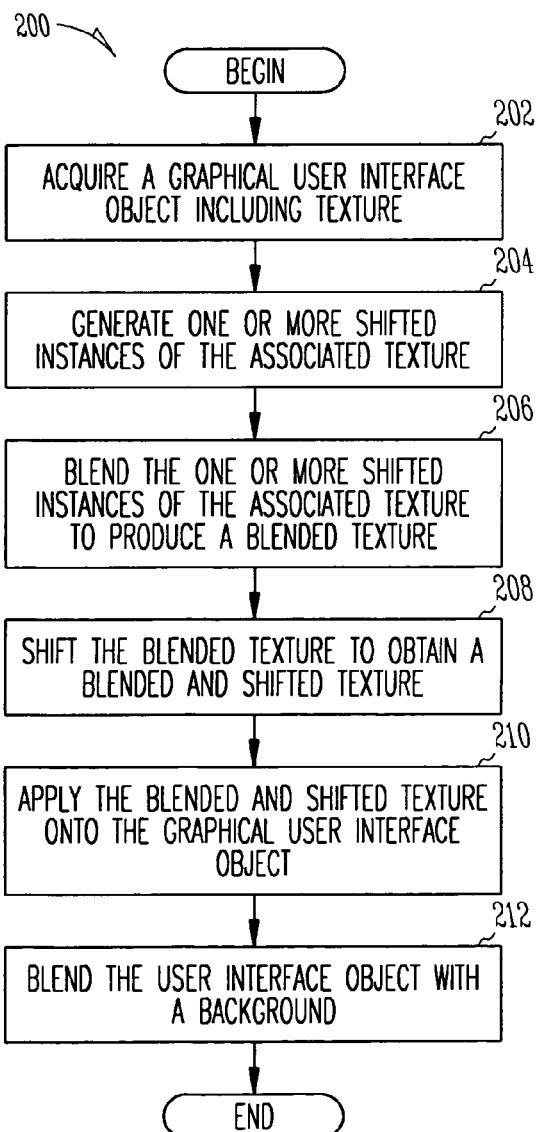
FIG. 2 is a flow diagram of a method for generating a shifted and blended graphical user interface object blended with a background in accordance with some embodiments of the present invention.

FIG. 2 is a flow diagram of a method 200 for generating a shifted and blended graphical user interface object blended with a background in accordance with some embodiments of the present invention. The method 200 includes acquiring a graphical user interface object including associated texture (block 202), generating one or more shifted instances of the associated texture (block 204), blending the one or more shifted instances of the associated texture to produce a blended texture, (block 206), shifting the blended texture to obtain a blended and shifted texture, (block 208), applying the blended and shifted texture to the graphical user interface object (block 210), and blending the graphical user object with a background (block 212).

In some embodiments, acquiring a graphical user interface object includes acquiring a graphical user interface window. For example, acquiring a graphical user interface object can include acquiring a graphical user interface window displaying a spreadsheet.

In some embodiments, blending the graphical user object with the background includes blending the graphical user interface window with one or more background windows. For example, blending the graphical user interface window with one or more background windows can include blending the graphical user interface window with one or more word processing windows.

In some embodiments, blending the graphical user interface window with one or more background windows, includes blending the graphical user interface window with one or more web page windows. For example, blending the graphical user interface window with one or more web page windows can include blending the graphical user interface window with one or more web page windows displaying a newspaper column.

In some embodiments blending the graphical user object with the background includes adding the graphical user object to the background. For example, blending the graphical user object with the background can include adding the graphical user object to a bump textured background.

Figure 3A:
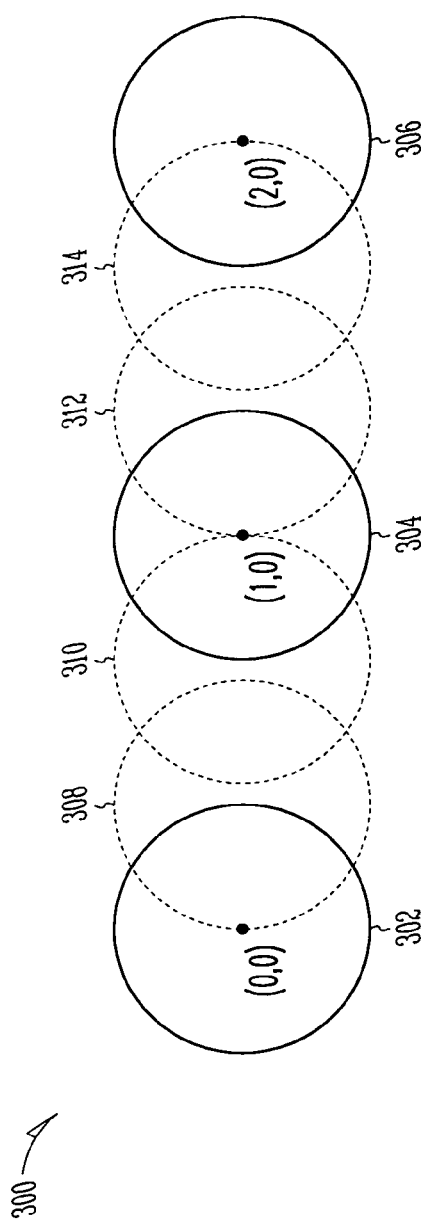
FIG. 3A is an illustration of a series of graphical user interface objects, including shifted objects, shown with dashed lines, in accordance with some embodiments of the present invention.
Figure 4:
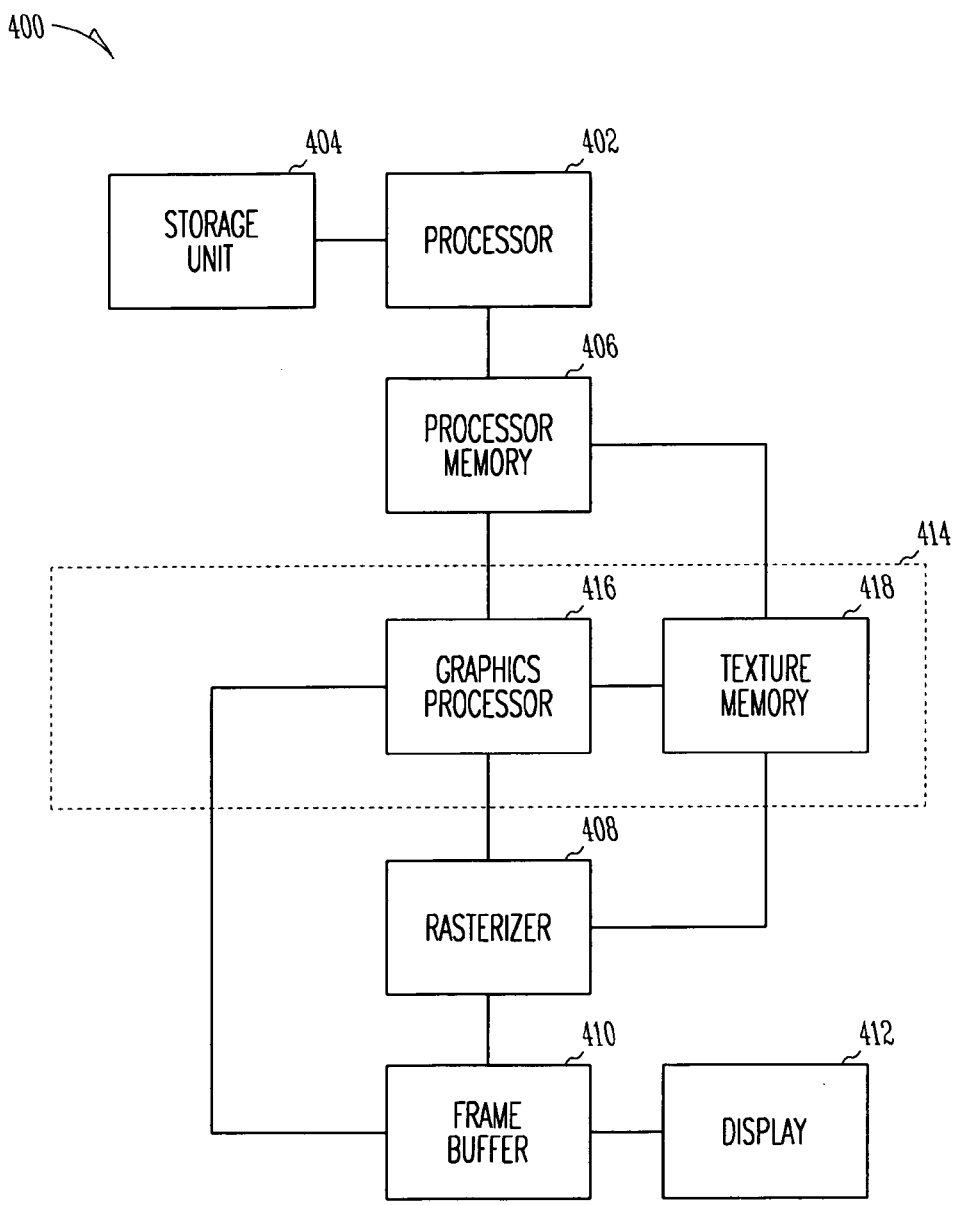
FIG. 4 is a block diagram of a computer system including a processor, a storage unit, a processor memory, a rasterizer, a frame buffer, a display, and a graphics pipeline suitable for use in connection with the methods shown in FIG. 1 and FIG. 2 in accordance with some embodiments of the present invention.

FIG. 3A is an illustration of a series 300 of graphical user interface objects 302, 304, and 306, including shifted objects 308, 310, 312, and 314, shown with dashed lines, in accordance with some embodiments of the present invention. The series 300 of graphical user interface objects 302, 304, and 306 are shown at points in a path from a coordinate (0,0) to a coordinate (2,0) traveled over a time t. The shifted objects 308, 310, 312, and 314 illustrate shifted instances of the graphical user interface objects 302, 304 and 306.

Figure 3B:
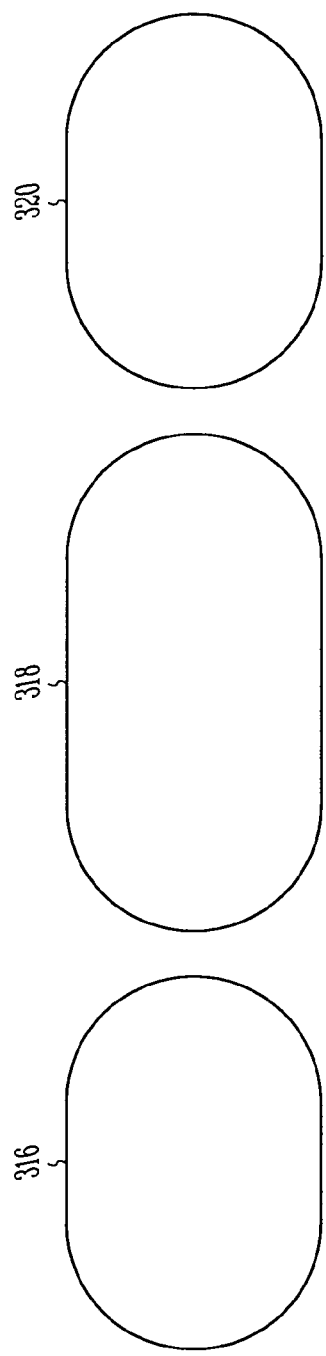
FIG. 3B is an illustration of shifted and blended objects formed from the graphical user interface objects, shown in FIG. 3A, and the shifted objects, shown in FIG. 3A.

FIG. 3B is an illustration of shifted and blended objects 316, 318, and 320 formed from the graphical user interface objects 302, 304, and 306, shown in FIG. 3A, and the shifted objects 308, 310, 312, and 314, shown in FIG. 3A. The shifted and blended objects 316, 318, and 320, sometimes referred to as blurred copies, of the graphical user interface objects 302, 304, and 306, shown in FIG. 3A, are formed by shifting each of the user interface objects 302, 304, and 306 to form the shifted objects 308, 310, 312, and 314, shown in FIG. 3A, and blending the shifted objects 308, 310, 312, and 314 with the graphical user interface objects 302, 304, and 306. For example, the shifted object 308 is blended with the graphical user interface object 302 to generate the shifted and blended object 316. The shifted objects 310 and 312 are blended with the graphical user interface object 304 to generate the shifted and blended object 318. The oblong shape of the shifted and blended object 318 is obtained by shifting and blending at both the leading and trailing edge of the graphical interface object 304. The shifted object 314 is blended with the graphical user interface object 306 to generate the shifted and blended object 320. Each of the shifted and blended objects 316, 318, and 320 has a substantially oblong shape, and when the shifted and blended objects 316, 318, and 320 are displayed in rapid succession on a visual display an illusion of motion is created.

Although only four shifted objects, the shifted objects 308, 310, 312, and 314, are used to form the shifted and blended objects 316, 318, and 320, those skilled in the art will appreciate that any number of shifted objects can be used in the generation of the shifted and blended objects 316, 318, and 320. In some embodiments, between about eight and about ten shifted objects are blended used to form one shifted and blended object. In addition, the relative transparency of each of the shifted objects 308, 310, 312, and 314 can be modulated or varied to obtain special effects, such as translucence, in the shifted and blended objects 316, 318, and 320, and in the resulting animation.

FIG. 4 is a block diagram of a computer system 400 including a processor 402, a storage unit 404, a processor memory 406, a rasterizer 408, a frame buffer 410, a display 412, and a graphics pipeline 414 suitable for use in connection with the methods shown in FIG. 1 and FIG. 2 in accordance with some embodiments of the present invention. The graphics pipeline 414 includes a graphics processor 416 and a texture memory 418. Although the description of the graphics processor 416 and the texture memory 418 provided below include particular functions associated with one or the other of these units, those skilled in the art will appreciate that any partitioning of functions between these units serves only to simply the description of the operation of the graphics pipeline 414. Functions included in the graphics processor 416 can be included in the texture memory 418, and functions included in the texture memory 418 can be included in the graphics processor 416.

The processor 402 is coupled to the storage unit 404 and the processor memory 406. The processor memory 406 is coupled to the graphics pipeline 414 at the graphics processor 416 and the texture memory 418. The graphics pipeline 414 is coupled, at the graphics processor 416 and the texture memory 418, to the rasterizer 408. The rasterizer 408 is coupled to the frame buffer 410. And the frame buffer 410 is coupled to the display 412 and to the graphics pipeline 414 at the graphics processor 416. Those skilled in the art will appreciate that the embodiment of the graphics pipeline 414, shown in FIG. 4, is only one embodiment of many possible embodiments of a graphics pipeline suitable for use in connection with the computer system 400.

The processor 402 is a programmable device that can store, retrieve, and process information. The processor 402 is not limited to a particular type of processor. Exemplary processors suitable for use in connection with the computer system 400 include complex instruction computer system processors, reduced instruction set processors, digital signal processors, and very long instruction word processors.

The storage unit 404 provides high capacity storage for the processor 402. The storage unit 404 is not limited to a particular type of storage. Exemplary types of storage units suitable for use in connection with the computer system 400 include magnetic storage, such as magnetic disk storage or magnetic tape storage, and optical storage, such as optical disk storage or holographic storage.

The processor memory 406 provides information storage having faster access times than the storage unit 404. The processor memory 406 is not limited to a particular type of processor memory. Exemplary types processor memory suitable for use in connection with the computer system 400 include semiconductor memory, such as random access memory, dynamic random access memory, static random access memory, magnetic random access memory, and flash memory.

The rasterizer 408 receives image information from the texture memory 418 and the graphics processor 416 and provides rasterized image information to the frame buffer 410.

The frame buffer 410 includes storage for preparing frames for display on the display 412. The frame buffer 410 includes semiconductor storage, such as dynamic random access memory.

The display 412 provides a visual display of information provided by the frame buffer 410. The display 412 is not limited to a particular type of display. Exemplary displays suitable for use in connection with the computer system 400 include cathode ray tube displays, plasma displays, and liquid crystal displays.

The graphics pipeline 414 includes the graphics processor 416 and the texture memory 418. The graphics processor 416 processes information received from the processor memory 406 and the texture memory 418. In some embodiments, the graphics processor 416 includes an integrated processor to process images composed of picture elements or pixels. In some embodiments, the graphics processor 416 includes a set of discrete processing units configurable for a particular type of image processing operation, such as blending or blending and shifting pixels.

In operation, the processor 402 reads texture information from the storage unit 404 and writes the texture information to the processor memory 406. In the graphics pipeline 414, the texture memory 418 reads texture information from the processor memory 406. The graphics processor 416 reads texture information from the texture memory 418 or the processor memory 406. The graphics processor 416 processes the texture information. The processing includes shifting and blending the texture information in one pass through the graphics pipeline 414 to obtain shifted and blended texture information. The graphics processor 416 applies the shifted and blended texture information to an object and provides the object to the rasterizer 408. In some embodiments, the graphics processor reads the texture memory 418 once and applies the texture to an object a plurality of times at different shifts or offsets to a graphical user interface object. In some embodiments, the graphical user interface object includes a graphical user interface window. The graphical user interface object or window (after having shifted and blended texture applied), when displayed at a plurality of locations on the display 412, provides the illusion of motion.

Figure 5:
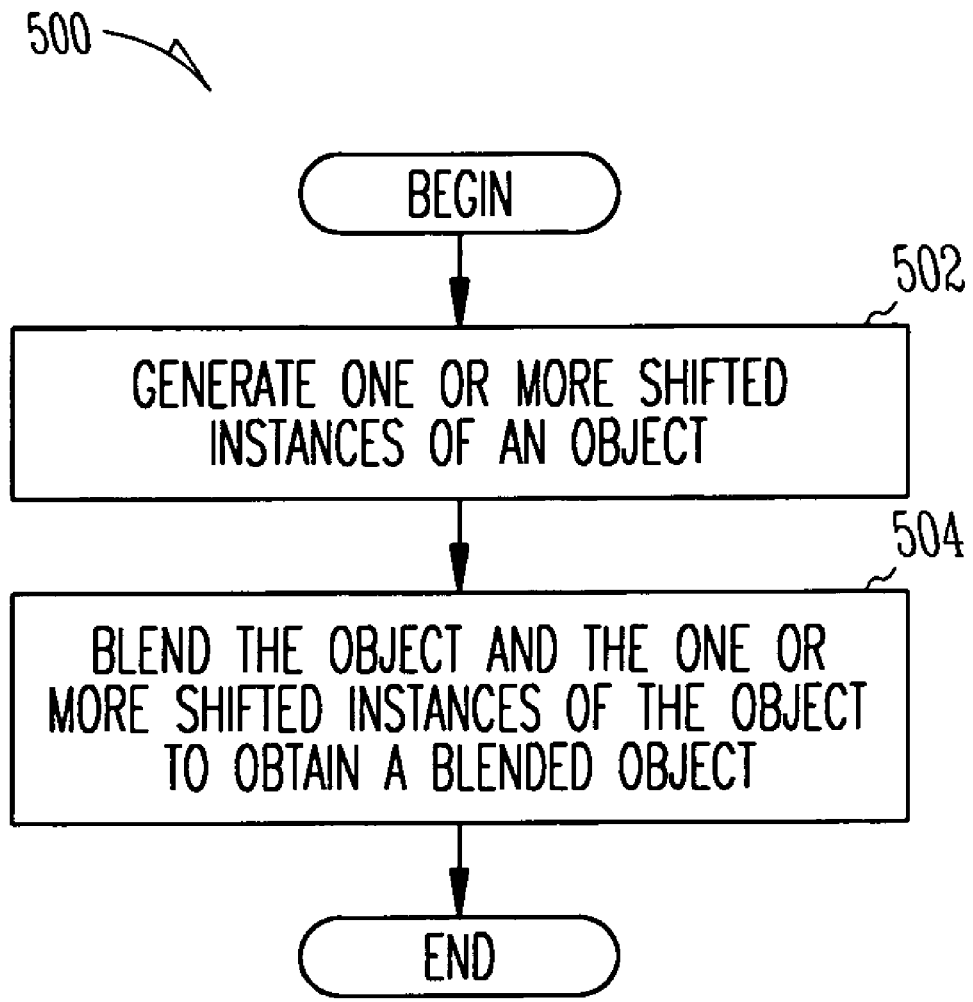
FIG. 5 is a flow diagram of a method suitable for use in connection with a machine readable medium, such as the storage unit, shown in FIG. 4, and the graphics processor, shown in FIG. 4, in accordance with some embodiments of the present invention.

FIG. 5 is a flow diagram of a method 500 suitable for use as machine executable instructions in connection with a machine readable medium, such as the storage unit 404, shown in FIG. 4, and the graphics processor 416, shown in FIG. 4, in accordance with some embodiments of the present invention. The method 500 includes generating one or more shifted instances of an object (block 502), and blending the object and the one or more shifted instances of the object to obtain a blended object (block 504). In some embodiments, the method 500 further includes displaying the blended object on a visual display. In some embodiments, the method 500 further includes blending the blended object with a background. In some embodiments, the method 500 further includes displaying the blended object with a background. In some embodiments, displaying the blended object with the background includes displaying the blended object with the background on a communication device.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. A method comprising:
    acquiring a graphical user interface object including associated texture;
    generating one or more shifted instances of the associated texture;
    blending the one or more shifted instances of the associated texture to produce a blended texture;
    shifting the blended texture to obtain a blended and shifted texture;
    applying the blended and shifted texture to the graphical user interface object to create a graphical user object;
    blending the graphical user object with a background; and
    displaying in succession the blended and shifted textures as applied to the graphical user object to create the illusion of motion.

2. The method of claim 1, wherein acquiring a graphical user interface object comprises acquiring a graphical user interface window.

3. The method of claim 2, wherein blending the graphical user object with the background comprises blending the graphical user interface window with one or more background windows.

4. The method of claim 3, wherein blending the graphical user interface window with one or more background windows comprises blending the graphical user interface window with one or more web page windows.

5. The method of claim 1, wherein blending the graphical user object with the background comprises adding the graphical user object to the background.

6. A machine readable medium having machine executable instructions for performing a method comprising:
    acquiring a graphical user interface object including associated texture;
    generating one or more shifted instances of the associated texture;
    blending the one or more shifted instances of the associated texture to produce a blended texture;
    shifting the blended texture to obtain a blended and shifted texture;
    applying the blended and shifted texture to the graphical user interface object to create a graphical user object;
    blending the graphical user object with a background; and
    displaying in succession the blended and shifted textures as applied to the graphical user object to create the illusion of motion.

7. The machine readable medium having machine executable instructions for performing the method of claim 6, further comprising displaying the blended graphical user object on a visual display.

8. The machine readable medium having machine executable instructions for performing the method of claim 6, wherein blending the graphical user object with a background includes the background comprising one or word processing windows.

9. The machine readable medium having machine executable instructions for performing the method of claim 6, further comprising displaying the blended graphical user object with a background.

10. The machine readable medium having machine executable instructions for performing the method of claim 9, wherein displaying the blended graphical user object with a background comprises displaying the blended object with a background on a communication device.

* * * * *